May 18, 1937.  J. HAAS  2,080,852
IDENTIFICATION TAG
Filed Feb. 12, 1934
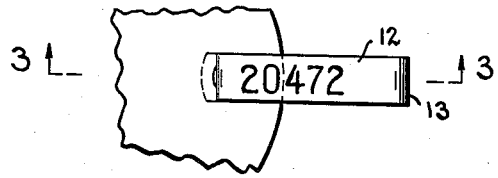
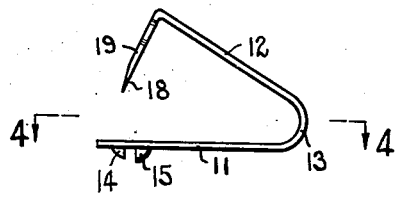
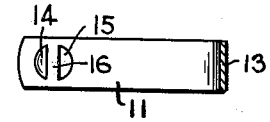
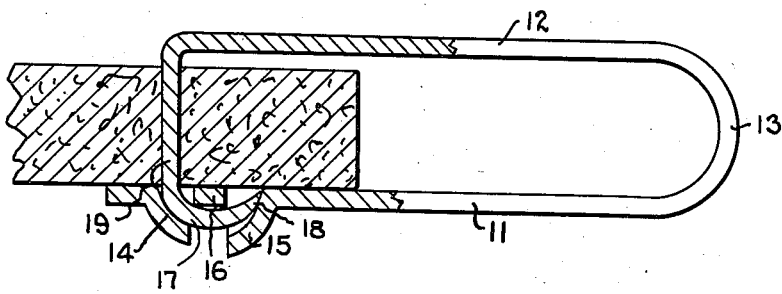
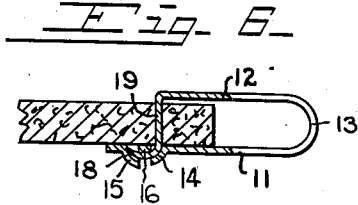
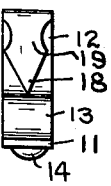
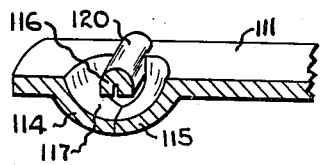
INVENTOR
JOSEPH HAAS.
BY *H.C. Karel*
ATTORNEY Patented May 18, 1937

2,080,852

UNITED STATES PATENT OFFICE 2,080,852

IDENTIFICATION TAG

Joseph Haas, Newport, Ky.

Application February 12, 1934, Serial No. 710,797

2 Claims. (Cl. 40—3)

This invention relates to certain new and useful improvements in identification tags which are attachable to the ears of animals, the wings of birds or fowls, or to hides or other materials on which it is desired to place an identification.

The object of my invention is to provide a simple, inexpensive device which can easily be attached and securely locked in position without the use of auxiliary fastening means. A further object is to so construct the fastening means to prevent any projecting portion thereof beyond the limits of the band, thus preventing releasing of the fastening means by contact with foreign objects. A further object is to provide a tag cut or stamped from a single piece of metal having a "U" shaped body member having the lower face thereof provided with a pair of depressions with a rib transverse and between the depressions for guiding the prong of the tag into one of the depressions and below the rib. A further object is to form these depressions in a semi-circular concave formation, whereby the prong contacting one of the depressions will start to curl and enter the other depression passing below the cross rib.

In tags heretofore constructed, the prong usually extended through a slot and was suitably clinched by means of a clamping tool, this method left the end of the prong exposed which often caught on foreign objects causing injury to the animal or fowl, or such foreign objects caused the point of the prong to be broken off making the identification tag insecure and in many instances to become dislodged from the animal and its identification to be lost. Or tags of this character could be quite easily removed and again used on other animals.

With my improved tag the clinching means is so arranged that when once placed and sealed to an object it is impossible to remove the same without serious damage to the tag.

My invention will be further readily understood from the following description and claims, and from the drawing in which latter;

Fig. 1 is a plan view of my improved tag, shown secured to the ear of an animal.

Fig. 2 is a side view of the same in open position prior to being attached to an object.

Fig. 3 is an enlarged longitudinal section of the same, taken on the line 3—3 of Fig. 1.

Fig. 4 is a horizontal section, taken on the line 4—4 of Fig. 2.

Fig. 5 is an end view of the tag in open position.

Fig. 6 is a view similar to Fig. 3, showing a modification of my device, and;

Fig. 7 is a sectional perspective view of a further modification.

I prefer to form my improved tag out of a single piece of metal having a base 11 and upper section 12 with a U shaped bend 13 between the base 11 and the upper section 12. Adjacent to the end of the base, I provide a pair of semi-circular concave depressions 14 and 15 formed in the base material in spaced relation leaving a cross-member 16 between the depressions, which are sufficiently deep to leave a space 17 between the cross-member 16 and the inner faces of the depressions. The depression 15 is slightly deeper than the depression 14 to insure the point 18, of the prong 19 extending from the upper section 12, to enter the depression 15. In inserting my improved tag in an object a suitable tool is employed for forcing the prong through the object and into contact with the concave recess 14. This contact will cause the end of the prong to curl and as additional pressure is brought upon the tag the point 18 will curl about the cross-member 16 and be received within the confines of the depression 15. With the end 18 curled about the cross-member the tag is securely sealed. In this method of sealing, the prong is contained within the tag thus completely eliminating any exposed part of the prong which might contact foreign objects or be removed by anyone with felonious intentions. Suitable identification marks may be placed on the outer faces of the base 11 and the upper section 12.

In the modification shown in Fig. 6 the recesses 14 and 15 are reversed with the upper section 12 of shorter dimensions, whereby the point 18 of the prong 19 will curl outwardly instead of inwardly as shown in Fig. 3.

In the modification shown in Fig. 7, the recesses 114 and 115 are formed with the metal drawn to completely enclose the space below the cross-bar, for a continuous guide for the prong and completely enclosing the prong when it is curled about the cross-bar 116, which is crimped to form a raised bead 120 to further aid in drawing the recesses together and guiding the prong to the recess. In this showing the reference numerals are raised to the series 100.

On tags having the prong enter a slot without the depressed portion, the prong is often diverted and does not enter the slot. With my improved tag the prong striking any portion of the depression will start to curl inwardly thus making every tag secure to the animal or object.

Having thus fully described my invention what I claim as new, and desire to secure by Letters Patent, is;

1. An identification tag provided with a base portion, an upper member provided with a prong, a pair of semi-circular depressions in said base portion, said base portion forming a bridge central of said depressions, one of said depressions extending below said bridge the thickness of said prong, the other depression being of greater depth for reception of the end of said prong, said prong upon entering said first named depression being deflected into said second named depression and curled therein, and said prong being firmly held between said bridge and said first named depression.

2. An identification tag provided with a base portion, an upper member provided with a prong, a pair of semi-circular depressions in said base portion, said base portion forming a bridge central of said depressions, one of said depressions extending below said bridge the thickness of said prong, the other depression being of greater depth for reception of the end of said prong, said prong upon entering said first named depression being deflected into said second named depression, and means on said prong for limiting the depth said prong can enter said depressions.

JOSEPH HAAS.